(Model.)

A. DEISHER & W. H. ADAM.
VEHICLE AXLE.

No. 254,625. Patented Mar. 7, 1882.

WITNESSES:
Francis McArdle.
C. Sedgwick

INVENTOR:
A. Deisher
W. H. Adam
BY Munn & Co.
ATTORNEYS.

UNITED STATES PATENT OFFICE.

ALFRED DEISHER AND WILLIAM H. ADAM, OF FLEETWOOD, PA.

VEHICLE-AXLE.

SPECIFICATION forming part of Letters Patent No. 254,625, dated March 7, 1882.

Application filed August 15, 1881. (Model.)

*To all whom it may concern:*

Be it known that we, ALFRED DEISHER and WILLIAM H. ADAM, of Fleetwood, in the county of Berks and State of Pennsylvania, have invented a new and Improved Vehicle-Axle, of which the following is a specification.

The object of this invention is to provide a device for preventing the wheel from moving in and out on the axle-spindle, and thereby to hold the wheel in place, that it may run with an easy, steady, and regular motion, and with less friction and liability to accident.

The invention consists of an adjustable collar with an attached sleeve set upon the axle behind and against the wheel-hub, and held at any desired point on the axle by a pin entered through the sleeve of the collar into any one of several grooves that are formed across the periphery of the axle.

Figure 1:
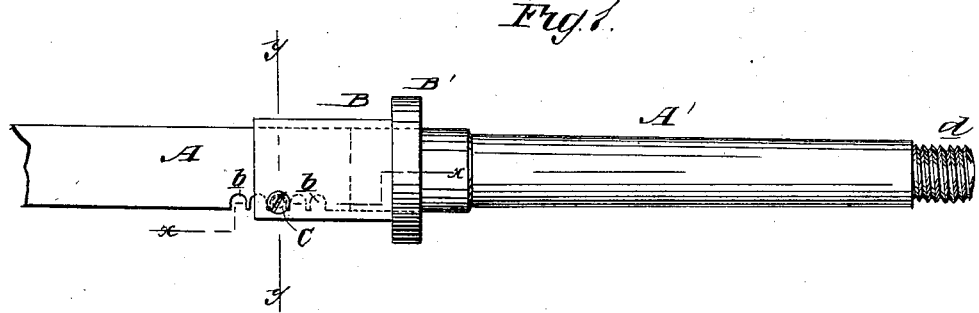
Figure 2:
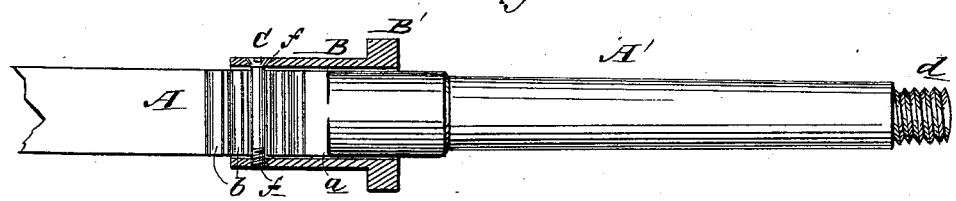
Figure 3:
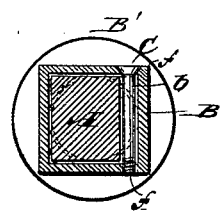

In the accompanying drawings, Figure 1 is a longitudinal elevation of our improved axle. Fig. 2 is a longitudinal sectional elevation of the same on line $x$ $x$, Fig. 1. Fig. 3 is a cross-section on line $y$ $y$, Fig. 1.

Similar letters of reference indicate corresponding parts.

In the drawings, A represents a square axle prolonged into a round spindle, A'. Across a face of the axle A, a little in rear of the shoulder $a$, are formed several parallel grooves, $b$, whose function will be hereinafter set forth.

B' represents a collar provided with an attached sleeve, B, that is square both interiorly and exteriorly fitted on the axle A, and extending over on the spindle A', so as to come against the hub of a wheel (not shown) that is designed to be set on said spindle A. This collar B' is designed to be moved out against the wheel-hub for the purpose of holding the wheel in place, and thereby preventing its swinging and working in and out. When said collar and sleeve B' B is moved out against the wheel it is held in place by a screw-bolt or pin, C, passed through the bolt-holes $f$ of sleeve B, near the edge thereof, and through one of the grooves $b$ in the side of the axle A. There being a number of grooves $b$, the collar and sleeve B' B can be adjusted to suit any wheel, the collar B' pressing against the hub thereof. The outer end of the spindle A is screw-threaded, as shown at $d$, to receive the usual axle-nut.

By the use of this device a wheel can be held so as to run always without swaying, and consequently both wheel and spindle will suffer less from friction, and the vehicle will ride more easily.

Having thus fully described our invention, we claim as new and desire to secure by Letters Patent—

1. The combination, with the axle A, of the loose collar B', provided with the sleeve B, and adjustably secured to the axle by the bolt C, substantially as and for the purpose set forth.

2. The combination, with the axle A, provided with cross-grooves $b$, of the loose collar with attached sleeve, B' B, having bolt-holes $f$ and bolt C, substantially as herein shown and described, whereby said collar is adjusted and held in position, as set forth.

ALFRED DEISHER.
WILLIAM H. ADAM.

Witnesses:
GEORGE KRAMER,
SOLOMON MALSBERGER.